United States Patent [19]

Godbersen

[11] Patent Number: 4,697,976
[45] Date of Patent: Oct. 6, 1987

[54] BOAT TRAILER

[76] Inventor: Byron L. Godbersen, Lake LaJune Estates, Ida Grove, Iowa 51445

[21] Appl. No.: 432,770

[22] Filed: Oct. 4, 1982

[51] Int. Cl.⁴ .............................................. B60P 3/10
[52] U.S. Cl. .................................. 414/559; 280/414.1; 414/532
[58] Field of Search ...................... 414/529, 532, 559; 280/414.1

[56] References Cited

U.S. PATENT DOCUMENTS

| | | | |
|---|---|---|---|
| 2,219,401 | 10/1940 | Sampsell | 414/529 |
| 2,608,418 | 8/1952 | Finlayson et al. | 280/414.1 X |
| 2,766,053 | 10/1956 | Madruga | 280/414 |
| 2,822,100 | 2/1958 | Pesta | 414/461 |
| 2,937,775 | 5/1960 | Funk | 414/476 |
| 2,938,735 | 5/1960 | Bennett | 280/414.1 X |
| 3,044,646 | 7/1962 | Sperow | 414/476 |
| 3,140,003 | 7/1964 | Horner | 414/477 |
| 3,173,558 | 3/1965 | Futch | 414/534 |
| 3,175,710 | 3/1965 | Kistner | 414/534 |
| 3,203,563 | 8/1965 | Blatchford | 414/531 |
| 3,403,798 | 10/1968 | Flachbarth et al. | 280/414.1 X |
| 3,578,190 | 5/1971 | May et al. | 414/494 |
| 3,756,439 | 9/1973 | Johnson | 414/534 |
| 3,774,790 | 11/1973 | Godbersen | 414/534 |
| 3,797,681 | 3/1974 | Brettrayer | 414/559 |
| 3,917,087 | 11/1975 | Godbersen | 414/534 |
| 4,050,595 | 9/1977 | Bussard | 280/414.1 |
| 4,214,774 | 7/1980 | Kluge | 280/414.1 X |
| 4,329,108 | 5/1982 | Godbersen | 414/534 |

Primary Examiner—Robert J. Spar
Assistant Examiner—David A. Bucci
Attorney, Agent, or Firm—Henderson & Sturm

[57] ABSTRACT

A boat trailer including a triangular frame comprised of a pair of identical, integrally formed frame sections connected by threaded fasteners. The running gear assembly and boat supporting structure is attached to the frame by fasteners to form a durable, inexpensive boat trailer that can easily be assembled and maintained by the user.

3 Claims, 4 Drawing Figures

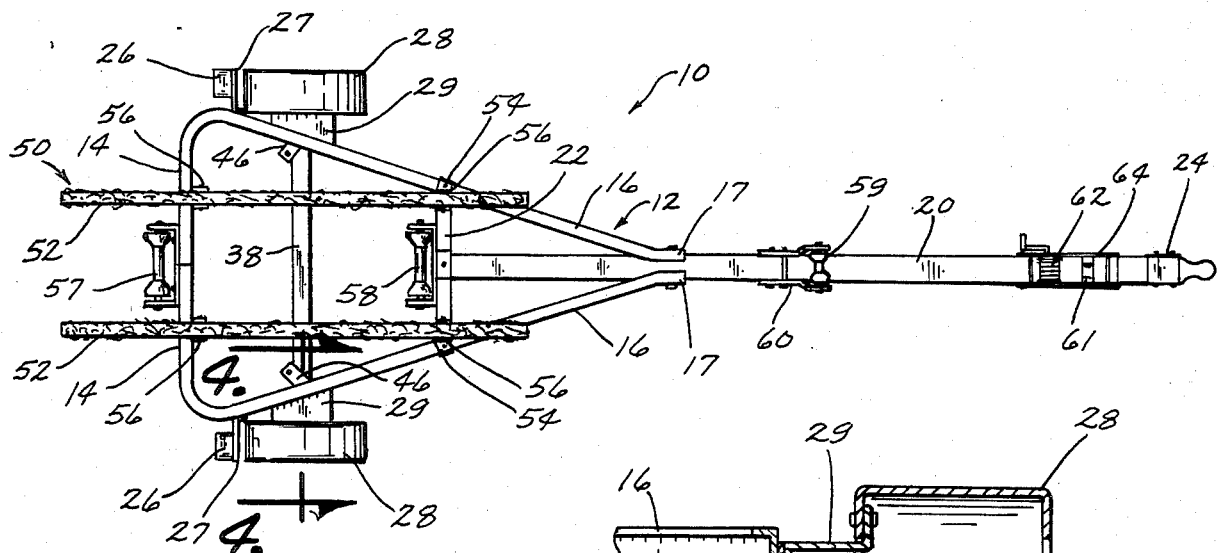
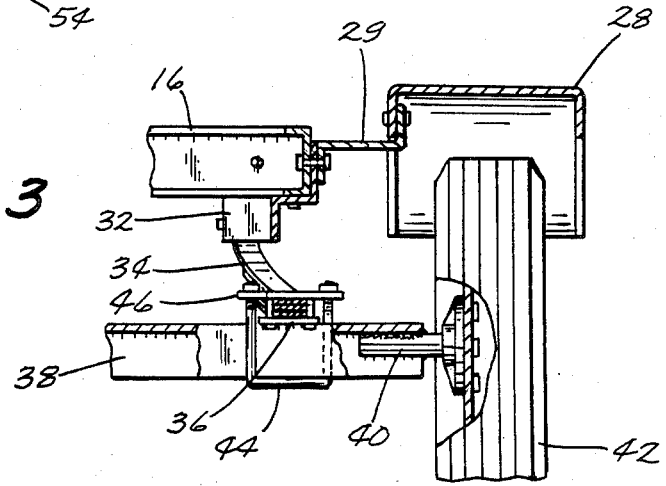

BOAT TRAILER

BACKGROUND OF THE INVENTION

The present invention relates generally to trailers and more particularly to boat trailers.

Conventional boat trailers are assembled by the manufacturer and shipped to their dealers where the trailers are held in inventory for sale to the end-use customer. These boat trailers are relatively expensive and the dealer's inventory carrying cost is affected by both the dealer's freight costs, purchase price, and the cost of physical storage of the assembled trailers. Reductions in dealer cost and reductions in physical size of the trailers would, of course, reduce the dealer's inventory costs, which reduction could be passed on to the customer.

Heretofore, it has been impractical to place the burden of assembling components upon the dealer or upon the end-use customer since special skills, tools and equipment were required to assemble a durable, functional boat trailer. Those concerned with these and other problems recognize the need for an improved boat trailer having a simple but durable design.

SUMMARY OF THE INVENTION

The present invention discloses a novel boat trailer having a triangular frame formed by a pair of integrally formed frame sections connected by threaded fasteners. The boat trailer of this invention is therefore easily assembled and maintained by the user without the need of special tools or sophisticated equipment. Also, the metal components may be formed of galvanized steel since no welding steps are required in assembly, and painting after assembly is unnecessary.

An object of the present invention is the provision of an improved boat trailer having a simple design.

Another object is to provide a boat trailer utilizing a triangular frame structure.

A further object of the invention is to provide a boat trailer that can easily be assembled and maintained by the user.

Still another object is to provide a boat trailer that is inexpensive and durable.

Other objects, advantages, and novel features of the present invention will become apparent from the following detailed description of the invention when considered in conjunction with the accompanying drawings.

BRIEF DESCRIPTION OF THE DRAWINGS

FIG. 3 is a top plan view of the boat trailer; and

FIG. 4 is a sectional rear elevational view taken along line 4—4 of FIG. 3.

DESCRIPTION OF THE PREFERRED EMBODIMENTS

Figure 1:
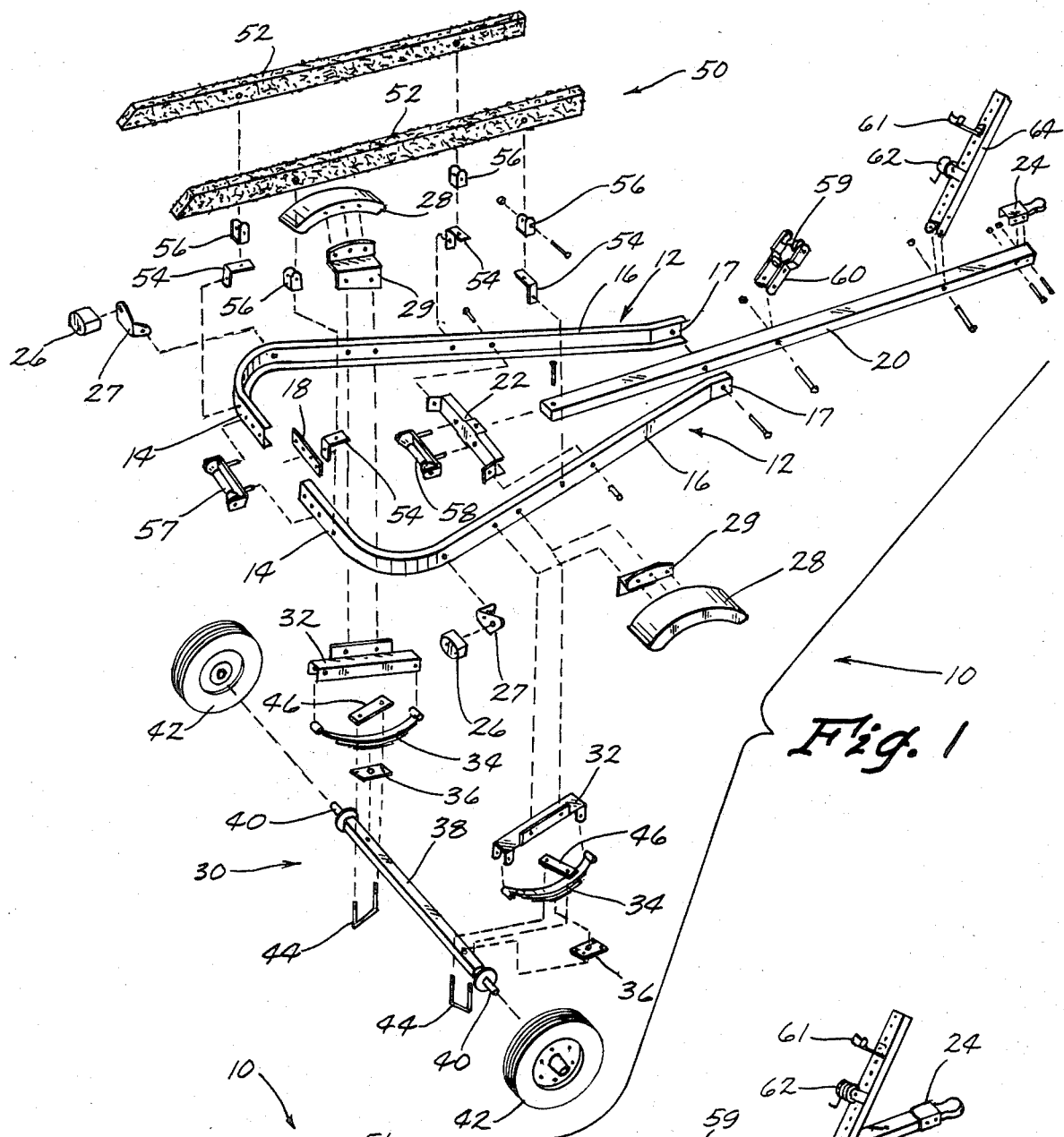
FIG. 1 is an exploded perspective view of the boat trailer of the present invention, showing the individual component parts and illustrating the procedure for assembling the triangular frame and other components which form the boat trailer.
Figure 2:
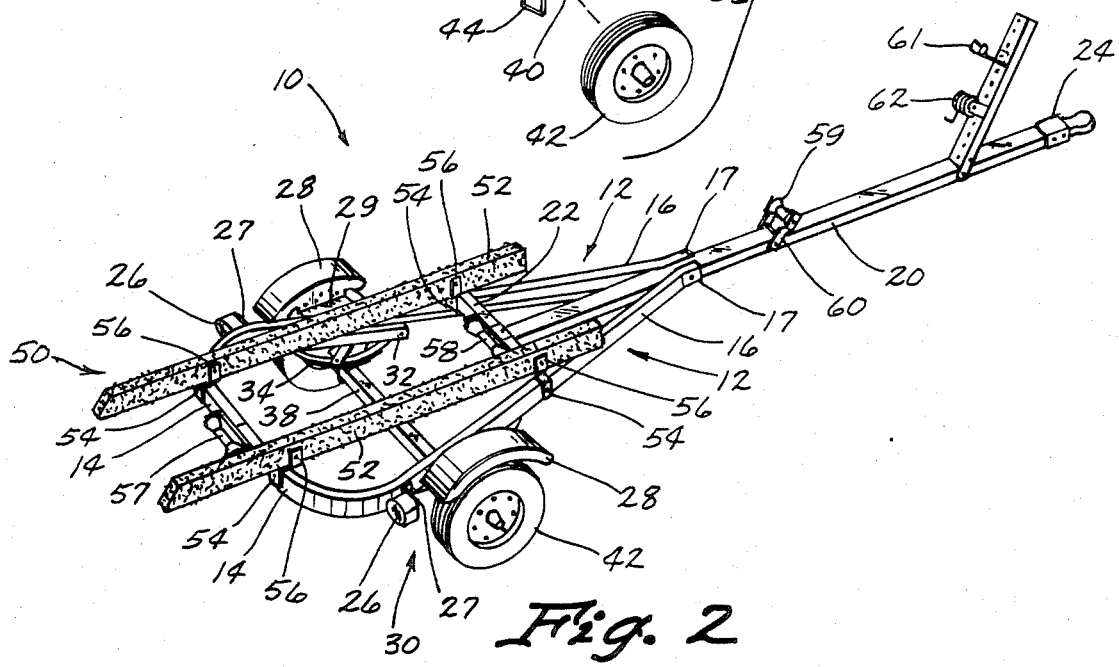
FIG. 2 is a perspective view of the fully assembled boat trailer of the present invention.

Referring now to the drawings wherein like reference numerals designate identical or corresponding parts throughout the several views, FIG. 1 shows the individual components of the boat trailer 10, and illustrates that the individual components shown may be fully assembled by simply using threaded fasteners such as metal screws or threaded bolts and nuts. Since the boat trailer 10 is designed such that no welds are required to complete the assembly, galvanized metal components can be used which results in longer life, and the end-use customer can easily assemble the boat trailer 10 without sophisticated tools and without the need to apply paint or other protective coatings.

The boat trailer 10 employs an unique triangular frame which is assembled by connecting a pair of identical, integrally formed frame sections 12. Each frame section 12 includes a rear member 14 and a side member 16. The rear members 14 extend outwardly from the longitudinal axis of the trailer 10, and the opposing free ends of rear member 14 are aligned and connected by threadably attaching a rear cross member 18. The side members 16 extend forward from the rear members 14 and converge toward the longitudinal axis of the trailer 10 to form the triangular frame when the opposing forward free ends 17 are connected with the tongue 20. A front cross member 22 is attached to and interconnects opposing side members 16 and the rearward end of tongue 20. A hitch 24 is attached to the forward end of tongue 20. Tail lights 26 are attached to each frame section 12 by tail light brackets 27, and the fenders 28 are attached to the side members 16 by fender brackets 29.

The running gear assembly, generally designated by the reference numeral 30 is attached to and supports the triangular frame. Spring shackles 32 are attached to and are disposed below and parallel to side members 16. Leaf springs 34 are attached to the spring shackles 32 and depend therefrom and rest on the axle brackets 36. The axle 38 includes a pair of spindles 40 attached by weldment at opposite ends of the axle 38 (see FIG. 4). The weld connecting the spindles 40 to the axle 38 is the only weld used, and the weld is made prior to shipment of the components to the dealer or customer. A pair of ground wheels 42 are mounted on and secured to the spindles 40. The axle 38 and leaf spring 34 are connected and clamped in position by U-bolts 44 which extend below the axle 38 and hold down plates 46, which extend across leaf springs 34. The running gear assembly 30 is thus securely attached to the triangular frame.

The boat supporting structure is generally designated as reference numeral 50, and includes a pair of linear bunks 52. The bunks 52 are generally formed of wood and covered with a carpet-like material. Each bunk 52 is attached to a single frame section 12 by frame bunk brackets 54 and wood bunk brackets 56 such that one point of the bunk 52 is attached to the rear member 14 and another point of the bunk 52 is attached to the side member 16. The bunks 52 are disposed parallel to each other and parallel to and on either side of the longitudinal axis of the trailer 10. A rear roller 57 is attached to the opposing pair of rear members 14 and intermediate roller 58 is attached to the front cross member 22. A front roller 59 is attached to the tongue 20 by an adjustable bracket 60 and a bow stop 61, together with a winch 62 supported by a winch post 64 attached to the forward part of the tongue 20.

As discussed earlier, the end-use customer can easily assemble the components without the need of special tools. Once fully assembled the boat trailer 10 is used in a conventional manner wherein a boat is loaded and launched by operation of the winch 62.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A boat trailer comprising:
   a triangular frame including a pair of identical, integrally formed frame sections, each frame sections including a front portion aligned with a rear portion, and a side portion intermediate said front and rear portions, said front and rear portions lying along the longitudinal axes of the frame, the side portion diverging rearwardly outwardly from the front portion and then curving inwardly to the rear portion, the pair of rear portions aligned and disposed normal to the frame longitudinal axis;
   means for releasably connecting said rear portions;
   means for releasably connecting said front portions;
   a hitch attached to the forward end of said frame for attachment to a prime mover;
   ground wheels attached to and supporting said frame;
   means for supporting a boat on said frame including a pair of elongated bunks, each bunk resting at a forward end on a frame section and at a rearward end on the same frame section whereby a single frame section supports a bunk at two locations thereon; and
   means for loading and launching a boat onto and off of the trailer.

2. The boat trailer of claim 1, wherein said frame sections are formed from straight sections of galvanized steel channel.

3. The boat trailer of claim 1, wherein a tongue member is disposed intermediate said front portions of said frame sections and said hitch is attached to the forward end of said tongue member.

* * * * *